United States Patent

[11] 3,603,434

[72] Inventor Roger Leroux
Paris, France
[21] Appl. No. 829,812
[22] Filed June 2, 1969
[45] Patented Sept. 7, 1971
[73] Assignee Societe Anonyme D.B.A.

[54] DISC FOR A DISC BRAKE
3 Claims, 3 Drawing Figs.

[52] U.S. Cl. .......... 188/73.6, 188/73.1, 188/218 XL
[51] Int. Cl. .......... F16d 65/12
[50] Field of Search .......... 188/73.6, 218 XL, 73.1, 73.2

[56] References Cited

UNITED STATES PATENTS 2,778,451 1/1957 Friedman .......... 188/73.6

FOREIGN PATENTS 966,573 8/1964 Great Britain .......... 188/218 XL
1,380,135 10/1964 France .......... 188/218 XL
665,273 1/1952 Great Britain .......... 188/73.1

*Primary Examiner*—George E. A. Halvosa
*Attorneys*—Cecil F. Arens and Plante, Arens, Hartz, Hix and Smith

ABSTRACT: This invention relates to a disc for a disc brake in which the extraction of the braking pads is effected parallelly to the plane of the disc. Each of the faces of the disc comprises at the periphery thereof a cutout portion provided through all the thickness of the disc or through at least a portion of said thickness, the length of the chord joining the intersection points of said cutout portion with the external edge of the groove made by the pad on the corresponding face being at least equal to the maximum size of said pad measured in a direction perpendicular to the direction of extraction of said pad. The pads are extracted easily after turning the disc to bring the pads to protrude out of the cut portion.

INVENTOR.

ROGER LEROUX

BY

Plante, Arens, Hartz, Hix and Smith

ATTORNEYS

DISC FOR A DISC BRAKE

SUMMARY

In a disc brake, upon braking, the pads are urged toward the disc by at least one brake actuator possibly comprising an adjusting device. After a certain time of operation, the pads groove in the opposite faces of the disc furrows or recessed annular grooves the external circular edges of which oppose the extraction of the pads parallel to the plane of the disc.

A solution could be contemplated consisting in having pads that are radially extending over the external edge of the disc. Thus after the disc has been worn the pads could be easily removed by moving them parallelly to the plane of the disc since the furrows grooved by the pads of the disc would not comprise any external edge opposing to their extraction. However, in operating that way each pad would be in contact with the disc only by a portion of its surface. The portion of the pad which extends out of the disc does not wear and thus advances progressively axially along the edge of the disc. Such a protrusion of the pad over the periphery of the disc is the origin of noise generating vibrations and, in the case of thick lining blocks, could possibly result in the engagement of the external offset portions of the pads substantially causing a complete vanishing of the braking power.

According to the invention, each of the faces of the disc comprises at the periphery thereof a cutout portion made through all the thickness of the disc or through at least a portion thereof, the length of the chord connecting the intersection point of said cutout portion with the external edge of the groove made by the pad on the corresponding face of the disc being at least equal to the overall size of said pad measured in a direction perpendicular to the direction of extraction of the pad out of the brake.

According to a preferred embodiment of the invention, each of the cutout portions consists of a recess having the shape of a crescent which is provided at the periphery of the disc. Said cutout portion has a circular edge which is tangent to the edge of the disc, the center of said circular edge being offset with respect to the center of the disc of a length which is equal to half the radial dimension of said cutout portion.

It may be understood that with such a disc, the pads may be extracted after turning the disc to bring the pads to protrude out of the cutout portion. On the other hand, the pads wear uniformly on all their surface which is in contact with the disc during the major part of the revolution of the said latter.

Other characterizing features of the invention will appear when reading the following description which refers to the accompanying drawings given only as example, in which.

Figure 2:
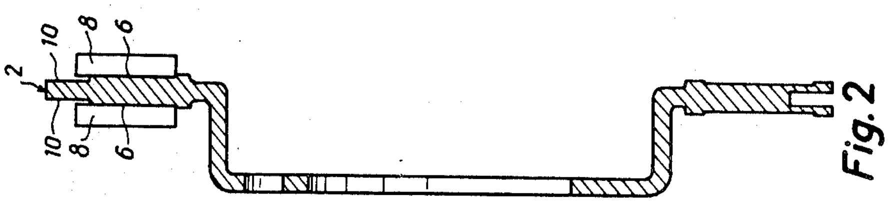
FIG. 2 is a diametral cross section along line 2—2 of FIG. 1.
Figure 1:
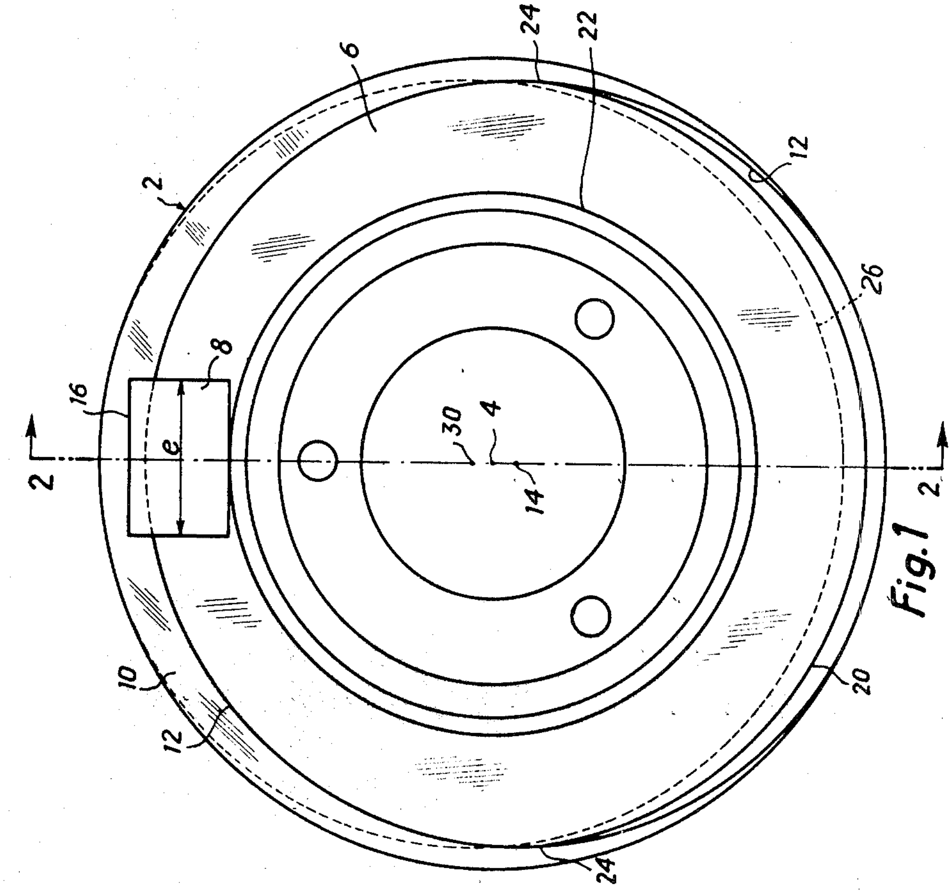
FIG. 1 is a plan view of a disc according to the invention.

In FIGS. 1 and 2, reference numeral 2 designates a disc having the center thereof at 4 and comprising on each of its faces a flat annular portion 6 provided to cooperate with a pad 8. Upon braking, the pads 8 move toward each other under the action of opposed forces generated by the piston(s) of the wheel cylinder(s) which may comprise an adjusting device.

Figure 3:
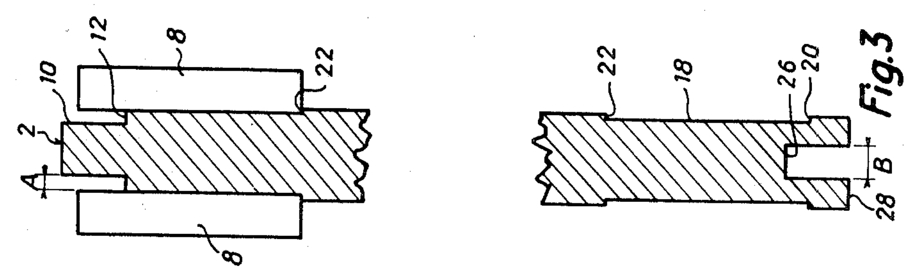
FIG. 3 is a partial cross section at a larger scale of a disc with its associated pads.

Disc 2 comprises at the periphery of each of its faces a cutout portion or recess 10 having the shape of a crescent or lune. The two recesses are symmetrical with respect to the median plane of the faces of the disc. The axial size "A" of recesses 10 is small with respect to the thickness of the disc as shown in FIG. 3. Recess 10 has a circular edge 12 centered at a point 14 slightly offset with respect to the center 4 of the disc. The circular edge 12 is internally tangent to the circular edge of the disc. It is clear that the external sides 16 of the pads slightly protrude over the edge 12 of the recess when the disc is in the position shown in FIG. 1 but that they come into contact with the faces 6 of the disc during the rotation of the latter.

After some time the wear of the disc due to the friction of the pads results in the ploughing of furrows or annular grooves 18 on each face of the disc, which grooves are comprised between circular external and internal edges or flanges 20 and 22, respectively, defined by the radially most external points of the pads. The circular edge 20 is a portion of a circle, the ends 24 of which are defined by the intersections of the circular edge 20 of the groove with the circular edge 12 of the recess. The depth of the groove is progressively retaken by the adjusting device so that for certain positions of the disc it may happen that the pads remain imprisoned between the edges 20 and 22 of groove 18.

With a view to extracting the pads 8 toward the exterior radially for instance, the following steps are to be taken: the disc is brought into its position shown in FIG. 1. Pads 8, the circumferential axis "$e$" of which is substantially smaller than the one of the chord connecting point 24 may thus be extracted toward the exterior without engaging the edge 20 since the latter is interrupted at points 24 which, in the shown example, are substantially diametrally opposed.

Because of the machining of recess 10 it is necessary to compensate for the out-of-balance of disc 2. For this purpose many solutions may be chosen; for instance, material may be taken away from the disc (groove, cutout, holes) in order to bring the center of gravity of the disc on its axis or rotation 4 and according to another solution, balance weights may be affixed to the disc.

In the shown embodiment, there has been machined in the depth of the lateral edge 28 of the disc, a circular groove 26 centered in a point 30 which is the symmetrical of center 16 of recess 10 with respect to center 4 of the disc. The radius of the circular groove 26 is equal to the one of the circular edge 12 and its axial dimension "B" is substantially twice the one "A" of the edge 12.

I claim:

1. In a disc brake:

a rotor having a pair of opposed friction faces;

said rotor having an axis of rotation extending generally perpendicularly to said faces;

a pair of friction elements, one of said elements being disposed adjacent each of said friction faces; and means for urging said friction elements into braking engagement with said friction faces;

a portion of each of said friction faces adjacent the outer periphery of the rotor being removed to provide a rotor having a first section of lesser thickness at the periphery of the latter and a second section of greater thickness disposed radially inwardly from said section of lesser thickness;

said friction elements being disposed for engagement with said second section and projecting over said first section whereby said friction elements may be removed radially outwardly with respect to the rotor independently of wear of said friction faces;

said first section extending over a portion of the outer periphery of said rotor, the remainder of the outer periphery of said rotor having a thickness substantially equal to the thickness of the rotor at said second section.

2. The invention of claim 1:

said first section presenting a circular edge tangent with the outer periphery of the rotor, the center of said circular edge being offset from the axis of rotation of said rotor, whereby said first section is substantially crescent shaped.

3. The invention of claim 1:

said rotor having a recess found in the outer edge thereof diametrically opposed to said first section to balance said rotor.